United States Patent
Wu et al.

(10) Patent No.: US 9,012,091 B2
(45) Date of Patent: Apr. 21, 2015

(54) ELECTROACTIVE MATERIALS FOR RECHARGEABLE BATTERIES

(71) Applicant: UChicago Argonne, LLC, Chicago, IL (US)

(72) Inventors: Huiming Wu, Darien, IL (US); Khalil Amine, Oakbrook, IL (US); Ali Abouimrane, Aurora, IL (US)

(73) Assignee: UChicago Argonne, LLC, Chicago, IL (US)

( * ) Notice: Subject to any disclaimer, the term of this patent is extended or adjusted under 35 U.S.C. 154(b) by 0 days.

(21) Appl. No.: 13/752,774

(22) Filed: Jan. 29, 2013

(65) Prior Publication Data

US 2014/0212755 A1      Jul. 31, 2014

(51) Int. Cl.
| | |
|---|---|
| H01M 8/04 | (2006.01) |
| H01M 4/485 | (2010.01) |
| H01M 4/131 | (2010.01) |
| H01M 4/36 | (2006.01) |
| H01M 4/38 | (2006.01) |
| H01M 4/505 | (2010.01) |
| H01M 10/052 | (2010.01) |
| H01M 10/054 | (2010.01) |
| H01M 12/08 | (2006.01) |

(52) U.S. Cl.
CPC .............. *H01M 4/485* (2013.01); *H01M 4/131* (2013.01); *H01M 4/364* (2013.01); *H01M 4/382* (2013.01); *H01M 4/386* (2013.01); *H01M 4/505* (2013.01); *H01M 10/052* (2013.01); *H01M 10/054* (2013.01); *H01M 12/08* (2013.01); *H01M 4/387* (2013.01)

(58) Field of Classification Search
USPC ......... 429/231.95, 221, 220, 223, 224, 231.1, 429/231.3, 231.9, 218.1
See application file for complete search history.

(56) References Cited

U.S. PATENT DOCUMENTS

| | | | | |
|---|---|---|---|---|
| 4,508,795 | A * | 4/1985 | Mamantov | 429/103 |
| 5,932,632 | A * | 8/1999 | Biensan et al. | 523/161 |
| 2003/0157409 | A1* | 8/2003 | Huang | 429/306 |
| 2011/0143218 | A1* | 6/2011 | Issaev et al. | 429/333 |

\* cited by examiner

*Primary Examiner* — Cynthia H Kelly
*Assistant Examiner* — Monique Wills
(74) *Attorney, Agent, or Firm* — Foley & Lardner LLP

(57) ABSTRACT

An as-prepared cathode for a secondary battery, the cathode including an alkaline source material including an alkali metal oxide, an alkali metal sulfide, an alkali metal salt, or a combination of any two or more thereof.

11 Claims, 14 Drawing Sheets

ELECTROACTIVE MATERIALS FOR RECHARGEABLE BATTERIES

GOVERNMENT RIGHTS

The United States Government has rights in this invention pursuant to Contract No. DE-AC02-06CH11357 between the U.S. Department of Energy and UChicago Argonne, LLC, representing Argonne National Laboratory.

FIELD

The present technology is generally related to secondary batteries. More particularly, the technology is related to electroactive materials that include lithium or sodium.

SUMMARY

In one aspect, an as-prepared cathode for a secondary battery is provided, the cathode including an alkaline source material that includes an alkali metal oxide, an alkali metal sulfide, an alkali metal salt, or a combination of any two or more such alkaline source materials. In some embodiments, the alkaline source material includes a lithium source material, a sodium source material, or a combination thereof. In some embodiments, the alkaline source material includes $Li_2O$, $Li_2O_2$, $Li_2S$, LiF, LiCl, $Li_2Br$, or a mixture of any two or more thereof. In some embodiments, the alkaline source material includes $Na_2O$, $Na_2O_2$, $Na_2S$, NaF, NaCl, or a mixture of any two or more such source materials. The alkaline source may include $Li_2O$. In some embodiments, the as-prepared cathode may further include a primary cathodic material. Such a primary cathodic material may include a lithiated primary cathodic material, a non-lithiated primary cathodic material, or a sodiated primary cathodic material. In some embodiments, the primary cathodic material includes a lithiated material configured to reversibly insert or de-insert lithium from about 1.2 V to about 5.0 V.

In another aspect, a secondary battery including the as-prepared cathode, above, is provided. In some embodiments, the secondary battery is a lithium-air battery, or a lithium ion battery.

In another aspect, an as-prepared secondary battery is provided, the battery including a cathode including a positive active material and a alkali source material, the alkali source material including an alkali metal oxide, an alkali metal sulfide, an alkali metal salt, or a combination of any two or more thereof; an anode including an anode active material; an electrolyte; and a separator. In some embodiments, the as-parepared secondary battery may be a lithium-ion battery, a lithium-air battery, a lithium-sulfur battery, a sodium-ion battery, a sodium-sulfur battery, or a sodium-air battery. In some embodiments of the battery, the alkaline source material is $Li_2O$, and the cathode further includes a lithium transition metal rich oxide composite. The lithium transition metal rich oxide composite may be a composite of formula $LiMO_2$-$Li_2M'O_3$, wherein M and M' are Ni, Mn, V, Ti, Cu, Co, Cr, or Fe. In some embodiments M and M' are the same and in other embodiments, they are different.

DETAILED DESCRIPTION

Figure 1:
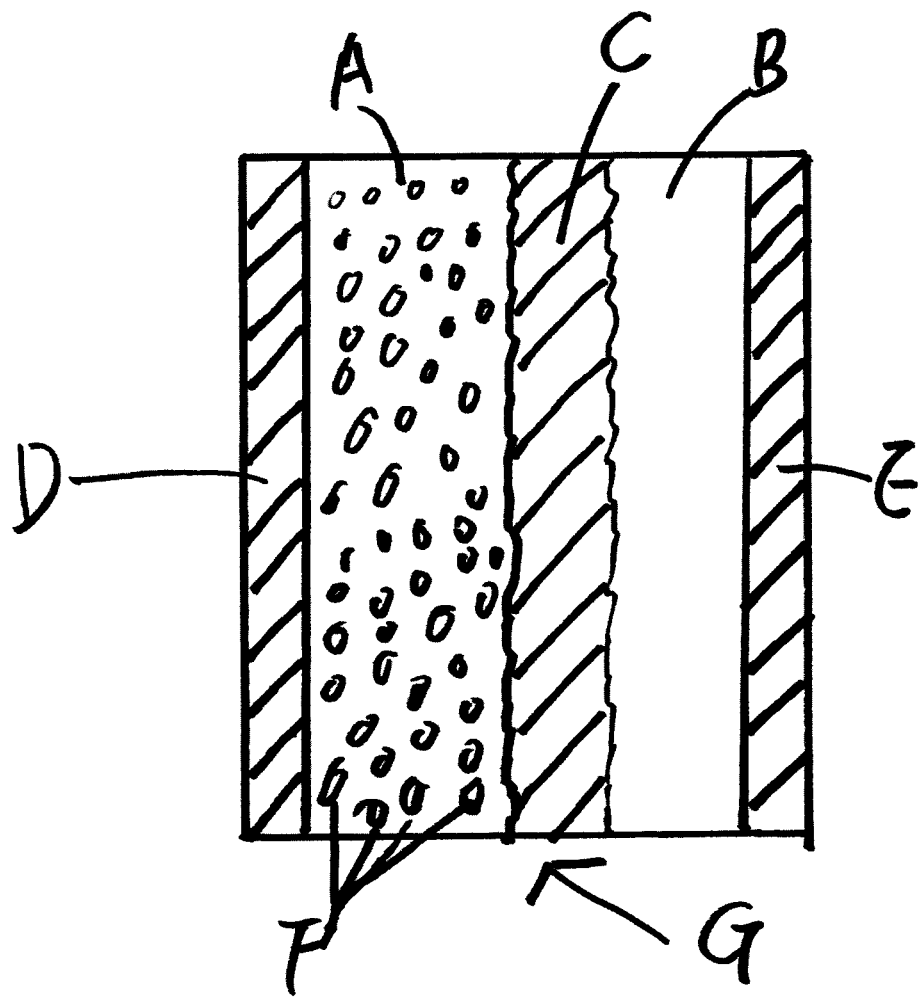
FIG. 1 is a simplified illustration of secondary battery construction including a cathode, anode, separator and electrolyte.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In one aspect, a secondary battery is provided having a high specific capacity and good cycleablility, and that can be used safely. The secondary battery includes a positive electrode (cathode), a negative electrode (anode), an electrolyte, and a separator. The cathode includes an alkali (Li or Na) source material configured to supply lithium or sodium to the battery. The secondary batteries include, but are not limited to, lithium ion batteries, lithium air batteries, lithium sulfur batteries, sodium batteries, and other rechargeable batteries. Also included are the cathodes for such secondary batteries, procedures for preparing such cathode and batteries, and methods of operating a secondary battery including such a cathode. In some embodiments, the cathode also includes an cathode active material.

The secondary batteries and cathodes described herein are "as-prepared" secondary batteries and cathodes. As used herein, "as-prepared" refers to a cathode or battery, as prepared, prior to any charging of the battery or cathode, or discharging of the battery or cathode. The "as-prepared" does not imply any sort of time constraint, or in other words, the cathode or battery may actually have been prepared long ago, but it was not subjected to any charging or discharging process. Accordingly, the as-prepared cathode or battery has not been subjected to electrochemical processes that would generate any lithium or sodium species other those species that were included in the battery or cathode in the first instance. In some embodiments, the secondary battery is a non-discharged secondary battery. In other embodiments, the cathode is a non-discharged cathode.

The alkaline source materials, are materials that may be activated and supply lithium or sodium ions for secondary batteries. Accordingly, an alkaline source material provides, at least a portion of, the transporter species in a battery: e.g. the lithium ions or the sodium ions. The alkaline source materials includes lithium source materials, in some embodiments. In other embodiments, the alkaline source material is a sodium source material. The alkaline source material includes, but is not limited to, $Li_2O$ (lithia), $Li_2O_2$, LiF, LiCl, $Li_2Br$, $Li_2S$, $Na_2O$, $Na_2O_2$, $Na_2S$, NaF, and NaCl. Where the secondary battery is a lithium ion battery, a lithium sulfur battery, or a lithium air battery, the alkaline source material may include, but is not limited to, $Li_2O$ (lithia), $Li_2O_2$, LiF, LiCl, $Li_2Br$, or $Li_2S$. Where the secondary battery is a sodium ion battery, a sodium sulfur battery, or a sodium air battery, the alkaline source material may include, but is not limited to, $Na_2O$, $Na_2O_2$, $Na_2S$, NaF, and NaCl. In some embodiments, the alkaline source material is $Li_2O_2$ or $Li_2O$. In some embodiments, the alkaline source material is lithia. It is noted that even where the battery is a sodium battery, lithia may be used to balance the cells.

Where the battery is a lithium air battery, the cathode may include a porous carbon material, a catalyst, and the alkaline source material. For example, where the battery is a lithium air battery, the cathode may include a porous carbon material, a catalyst, and $Li_2O$. In other lithium ion batteries, where the cathode includes non-lithiated active materials, e.g. $MnO_2$, the amount of alkaline source material in the cathode may be from about 1 wt % to about 40 wt % in the as-prepared cathode. This includes where the amount of alkaline source material in the cathode is from about 5 wt % to about 10 wt %, or from about 10 wt % to about 40 wt % in the as-prepared cathode. Where the cathode includes lithiated active materials, e.g. $LiFePa_4$, the amount of alkaline source material in the cathode is from about 1 wt % to about 10 wt % in the as-prepared cathode.

The alkaline source materials may be finely divided particles having a mean particle size of less than 20 μm. For example, the particles may have a mean particle size of from about 1 nm to about 20 μm. In some embodiments, the particles may have a mean particle size of from about 1 nm to about 1000 nm. In yet other embodiments, the particles may have a mean particle size of from about 20 nm to about 500 nm. In yet other embodiments, the particles may have a mean particle size of from about 20 nm to about 100 nm. In yet other embodiments, the particles may have a mean particle size of from about 100 nm to about 10 μm.

For example, in some embodiments, the lithia is particulate. The Lithia may have a mean particle size of less than 20 μm, or any of the size ranges listed in the previous paragraph.

The alkaline source material, i.e. the lithia, may be dispersed in or on the cathode by blending, coating, vapor-phase deposition, spraying, firing, and liquid-phase deposition, chemical vapor deposition (CVD), electrochemical deposition, atomic layer deposition (ALD), molten methods utilizing an arc melting furnace, a high frequency induction heater, mechanical alloying, gas atomizing, or other mechanical or chemical means. The lithia may be blended into the cathode material, coated on the cathode, coated on cathode side of the surface of a separator, or coated on a current collector. In some embodiments, lithia and the cathode material may be mixed together with a binder, and any other desired materials, to produce a slurry that is then applied to a current collector and dried to form the cathode.

In addition to the alkaline source material the cathode may include a catalyst configured to activate the lithia at low voltage to release lithium ions. Such catalysts may include, but are not limited to, porous carbon, nanostructured carbon functionalized, polymers, transition metal oxides, non-precious metals, precious metals and metal alloys.

The cathodes, or the cathode(s) of the secondary battery, also include a primary cathodic material. In some embodiments, the cathode includes a mixture of the alkaline source material and the primary cathodic material. The primary cathodic material may include a lithiated positive active material, a non-lithiated positive active material, a sodiated positive active material, a non-sodiated positive active material, or a mixture of any two or more thereof. In some embodiments, the primary cathodic material may include a lithiated positive active material, a sodiated positive active material, or a mixture of any two or more thereof.

The primary cathodic material may include a positive active material that is configured to reversibly insert, or de-insert lithium or sodium. For example, the positive active material may be configured to reversibly insert, or de-insert lithium from about 1.5 V to about 5.0 V vs. lithium. Alternatively, the positive active material may be configured to reversibly insert, or de-insert sodium from 1.2 to 5.0 V vs. lithium. As used herein, "insert" or "de-insert" is used to refer to the movement of either the lithium or sodium ion(s) into, or out of, respectively, the cathode material either through absorption, adsorption, intercalation, conversion, or alloying.

For lithium secondary batteries, or cathodes to be used in lithium secondary batteries, the primary cathodic material may include either lithiated materials or lithium transition metal rich oxide composites. For example, such materials and composites include, but are not limited to, $MnO_2$, $V_2O_5$, $LiVO_3$, $MoS_2$, $FeS_2$, S, air (oxygen), $FeF_3$, $FeF_2$, a spinel, an olivine, a carbon-coated olivine, $LiFePO_4$, $LiCoO_2$, $LiNiO_2$, $LiNi_{1-x}Co_yM^4_zO_2$, $LiMn_{0.5}Ni_{0.5}O_2$, $Li_{1+x}Mn_{2-z}M^4_yO_{4-m}X^1_n$, $LiFe_{1-z}M^6_yPO_{4-m}X^1_n$, $LiMn_{1/3}Co_{1/3}Ni_{1/3}O_2$, $LiMn_2O_4$, $LiFeO_2$, $LiM^4_{0.5}Mn_{1.5}O_4$, $Li_{1+x''}Ni_\alpha Mn_\beta Co_\gamma M^5_\delta O_{2-z''}F_{z''}$, $Li_2MnO_3$—$Li_aM_bM'_cM''_dO_e$, $Li_n B^1_2(M^2O_4)_3$ (Nasicon), $Li_2MSiO_4$, or a mixture of any two or more thereof, wherein $M^2$ is P, S, Si, W, or Mo; $M^4$ is Al, Mg, Ti, B, Ga, Si, Ni, or Co; $M^5$ is Mg, Zn, Al, Ga, B, Zr, or Ti; A is Li, Ag, Cu, Na, Mn, Fe, Co, Ni, Cu, or Zn; $M^6$ is Al, Mg, Ti, B, Ga, Si, Ni, Mn or Co; M, M', and M'' are transition metals; $B^1$ is Ti, V, Cr, Fe, or Zr; $X^1$ is S or F; $0 \le x \le 0.3$; $0 \le y \le 0.5$; $0 \le z \le 0.5$; $0 \le m \le 0.5$; $0 \le n \le 0.5$; $0 \le x'' \le 0.4$; $0 \le a \le 2$; $0 \le b \le 1$; $0 \le c \le 1$; $0 \le d \le 1$; $0 \le \alpha \le 1$; $0 \le \beta \le 1$; $0 \le \gamma \le 1$; $0 \le \delta \le 0.4$; $0 \le z'' \le 0.4$; $0 \le n' \le 3$; $0 < a+b+c+d \le 6$; $0 < e \le 4$; and $0 < \alpha + < + \gamma +$.

The primary cathodic material may include, in some embodiments, a spinel, an olivine, or a carbon-coated olivine. For example, the primary cathodic material may be, according to an embodiment, a spinel manganese oxide of formula of $Li_{1+x}Mn_{2-z}M^4_yO_{4-m}X^1_n$, wherein $M^4$ is Al, Mg, Ti, B, Ga, Si, Ni, or Co; $X^1$ is S or F; $0 \le x \le 0.3$; $0 \le y \le 0.5$; $0 \le z \le 0.5$; $0 \le m \le 0.5$; and $0 \le n \le 0.5$. The primary cathodic material may be, according to an embodiment, an olivine of formula of $LiFe_{1-z}M^6_yPO_{4-m}X^1_n$, or a mixture of any two or more such olivines; wherein $M^6$ is Al, Mg, Ti, B, Ga, Si, Ni, Mn or Co; $X^1$ is S or F; $0 \le x \le 0.3$; $0 \le y \le 0.5$; $0 \le z \le 0.5$; $0 \le m \le 0.5$; and $0 \le n \le 0.5$.

The primary cathodic material may include a blend of a spinel and $Li_{1+x''}Ni_\alpha Mn_\beta Co_\gamma M^5_\delta O_{2-z''}F_{z''}$, wherein $M^5$ is Mg, Zn, Al, Ga, B, Zr, or Ti; $0 \le x'' \le 0.4$; $0 \le \alpha \le 1$; $0 \le \beta \le 1$; $0 \le \gamma \le 1$; $0 \le \delta \le 0.4$; $0 \le z'' \le 0.4$; and $0 < \alpha + \beta + \gamma + \delta$. The ratio of the spinel to the $Li_{1+x''}Ni_\alpha Mn_\beta Co_\gamma M^5_\delta O_{2-z''}F_{z''}$ may be from about 0.5 wt % to about 98 wt %. Alternatively, the primary cathode may include a blend of a olivine or a carbon-coated olivine, and $Li_{1+x''}Ni_\alpha Mn_\beta Co_\gamma M^5_\delta O_{2-z''}F_{z''}$, wherein $M^5$ is Mg, Zn, Al, Ga, B, Zr, or Ti; $0 \le x'' \le 0.4$; $0 \le \alpha \le 1$; $0 \le \beta \le 1$; $0 \le \gamma \le 1$; $0 \le \delta \le 0.4$; $0 \le z'' \le 0.4$; and $0 < \alpha + \beta + \gamma + \gamma$. The ratio of the ratio of the olivine or carbon-coated olivine to the $Li_{1+x''}Ni_\alpha Mn_\beta Co_\gamma M^5_\gamma O_{2-z''}F_{z''}$ may be from about 0.5 wt % to about 98 wt %.

The primary cathodic material may include a non-lithiated material such as $MnO_2$, $V_2O_5$, $LiVO_3$, $MoS_2$, $FeS_2$, S, air (oxygen), $FeF_3$, $FeF_2$, or a mixture of any two or more thereof. In other embodiments, the primary cathodic material includes S. In some embodiments, the primary cathodic material is air (oxygen).

Mixing of lithium transition metal rich oxide composites (e.g. $Li_{1.2}Ni_{0.15}Co_{0.1}Mn_{0.55}O_2$) with $Li_2O$ may lead to a significant activation of $Li_2O$ which provide a high capacity (e.g. about 800 mAh/g in Example 12 and about 1140 mAh/g in Example 12) based on the weight of $Li_2O$. $Li_2O$ may be mixed with lithium transition metal rich oxide composites (e.g. $LiMO_2$-$Li_2M'O_3$; M, M' are Ni, Mn, V, Ti, Cu, Co, Cr, or Fe) and non-lithiated cathode materials (e.g. $MnO_2$, S, $V_2O_5$, $MnF_3$, $FeF_3$). In such a mixture, the cell configuration may be a mixture of $Li_2O$, a lithium manganese rich oxide composite (e.g. $LiMO_2$-$Li_2M'O_3$, where M and M' are Ni, Mn, Co, Cr, or Fe) and non-lithiated material as the cathode, and either graphite, a carbonaceous material, Si, Sn, SiO, Si—C, $Li_4Ti_5O_{12}$, a tin oxide, a tin carbon, a composite tin alloy, a transition metal oxide, a lithium metal nitride, or a mixture of any two or more thereof as the anode.

In another embodiment, a lithiated cathode material, such as, but not limited to, $LiMn_2O_4$, $LiFePO_4$, or $LiMn_{1/3}Co_{1/3}Ni_{1/3}O_2$ may be mixed with $Li_2O$ and a small amount of lithium transition metal rich oxide composite (e.g. $LiMO_2$-$Li_2M'O_3$, where M and M' are Ni, Mn, Co, Cr, or Fe). In this case, the anode may be either graphite, a carbonaceous material, Si, Sn, SiO, Si—C, $Li_4Ti_5O_{12}$, a tin oxide, a tin carbon, a composite tin alloy, a transition metal oxide, a lithium metal nitride, or a mixture of any two or more thereof. As used herein a tin carbon is a tin-carbon composite, a carbon-coated tin, or a tin-carbon alloy.

Where the cathode is for use in a sodium ion electrochemical cell, the primary cathodic material may include $NaM_{1-x}M'_xPO_4$, $Na_xM_yM'_zO_2$, $Na_2FePO_4F$, $Na_2MnPO_4F$, $NaFeSO_4F$, $NaMnSO_4F$, $NaV_{1-a}Cr_aPO_4F$, $Na_2S$, $Na_2Se$, or a mixture of any two or more thereof, wherein $0 < x$; $0 < y+z$; M is Mn, Ni, Fe, Co, or Cu; M' is Cr or Mg; and $0 \le a \le 1$.

In addition to the alkali source material and primary cathodic material, the cathode may include a current collector, a porous carbon (e.g. conductive) material, and/or a polymeric binder. The current collector may include copper, stainless steel, titanium, tantalum, platinum, gold, aluminum, nickel, cobalt nickel alloy, highly alloyed ferritic stainless steel containing molybdenum and chromium; or nickel-, chromium-, or molybdenum-containing alloys. The current collector may be a foil, mesh, or screen, and the porous carbon material and optional metal oxide are contacted with the current collector by casting, pressing, or rolling the mixture thereto. The porous carbon material may include microporous carbon, mesoporous carbon, mesoporous microbeads, graphite, expandable graphite, carbon black, or carbon nanotubes. Commercial examples of carbon black include, but are not limited to, Super P, Black Pearl 2000, Denka Black, Vulcan XC72R, Ketjen black. The polymeric binder may include poly(acrylonitrile), poly(vinylidene fluoride), polyvinyl alcohol, polyethylene, polystyrene, polyethylene oxide, polytetrafluoroethylene, polyimide, styrene butadiene rubber, carboxy methyl cellulose, gelatin, or a copolymer of any two or more such polymers.

The anode in the secondary batteries described above may include graphite, Li metal, Si, Si—C, SiO, Sn, Sb, tin oxide, $Li_4Ti_5O_{12}$, and the like. While the cathode includes lithia, the lithia may be activated during the initial charges and supply lithium source for batteries. The lithia may supply lithium for the anode, and after discharge, the lithium is transmitted from anode to cathode, then supply for the cathode material during battery cycling. The Lithia may compensate anode initial irreversible capacity loss and supply for the cathode material, especially for non-lithiated cathode materials.

In addition to a cathode and anode, the batteries may include an electrolyte. The electrolyte may include a solvent and a salt. Suitable solvents for use in the electrolytes are typically polar aprotic solvents. Illustrative solvents include, but are not limited to, ethylene carbonate (EC), dimethylcarbonate (DMC), diethylcarbonate (DEC), propylene carbonate (PC), dioloxane, γ-butyrolactone, δ-butyrolactone, dimethyl ether, a silane, siloxane N-methyl acetamide, acetonitrile, an acetal, a ketal, esters, a carbonates, a sulfone, a sulfite, sulfolane, an aliphatic ether, a cyclic ether, a glyme, a polyether, a phosphate ester, a siloxane, a N-alkylpyrrolidone, fluoro ether and fluoro esters, fluoroethylene carbonate, or adiponitrile. Of course, a mixture of any two or more such solvents may also be used. In some embodiments the solvent is a mixture of solvents such as, but not limited to, EC-DMC, EC-DEC, EC-PC, EC-PC-DMC, EC-PC-DEC, or EC-DEC-DMC. In some embodiments, fluorinated derivatives of the above solvents may be used. Suitable salt materials include, but are not limited to, a lithium salt, a sodium salt, an ammonium salt, an alkylammonium salt, a lithium polysulfide, a or a lithium polyselenide. Illustrative salts are $LiPF_6$, $LiClO_4$, $(C_4BO_8Li)$, $(C_2BO_4F_2Li)$, $LiPF_4C_2O_4$, $Li(CF_3SO_2)_2N$, $LiC(SO_2CF_3)_3$, $(Li(C_2F_5SO_2)_2N)$, $LiCF_3SO_3$, $Li_2B_{12}X_{12-n}H_n$, $Li_2B_{10}X_{10-n'}H^{n'}$, where X is a halogen, n is an integer from 0 to 12, and n' is an integer from 0 to 10, $LiAlF_4$, $LiBF_4$, $Li(FSO_2)_2N$, $Li_2SO_4$, $Na_2SO_4$, $NaPF_6$, $NaClO_4$, $LiAlO_2$ LiSCN, LiBr, LiI, $LiAsF_6$, $LiB(Ph)_4$, $LiSO_3CH_3$, $Li_2S_{x''}$, $Li_2Se_{x''}$, $(LiS_{x'}R)_y$, or $(LiSe_{x'}R)_y$; wherein x'' is an integer from 1 to 20, y is an integer from 1 to 3 and R is H, alkyl, alkenyl, aryl, ether, F, $CF_3$, $COCF_3$, $SO_2CF_3$, or $SO_2F$.

In addition to a cathode and anode, the batteries may include a separator. Illustrative separators include, but are not limited to, polyethylene, polypropylene, or polyvinylidene fluoride (PVDF).

In another aspect, a method of operating a secondary battery is provided. In the method, a as-prepared secondary battery is provided, the secondary battery having a cathode, an anode, a separator, and electrolyte. The as-prepared secondary battery cathode includes an alkali source material that includes a lithium material, such as Lithia. In particular, the secondary battery is manufactured with lithia blend with cathode active material in the positive electrode. The freshly assembled battery is in a discharged state. For example, the freshly assembled battery may be fully discharged, with all the alkaline source material, i.e. lithium or sodium, in the positive electrode of the as-prepared battery. The method may include charging the as-prepared secondary battery by transmitting lithium (or sodium) ions from positive electrode to the negative electrode through the electrolyte. The secondary battery may then be discharged by transmitting lithium ions from the anode to cathode through the electrolyte, and then charging again by transmitting lithium (or sodium) ions from cathode to anode through the electrolyte.

In a lithium secondary battery, during the initial charging, lithia in the cathode may be activated by applying a sufficiently high potential. In the discharging process the cathode active material incorporates the lithium from the anode side, and then the lithiated cathode material releases lithium ions to anode during subsequent charging.

The charging and discharging may occur for numerous cycles while maintaining the high capacities of the cathode active material and maintaining safe operating conditions. In some cases a catalyst may be used to activate the lithia at lower voltage. Such catalysts include, but are not limited to, are porous carbon, nanostructured carbon functionalized, polymers, transition metal oxides, non-precious metals, precious metals or metal alloys.

Now, turning to the figures, a secondary battery, G, according to an embodiment of the present invention is illustrated in FIG. 1. The secondary battery G includes a positive electrode (i.e. cathode) A, a negative electrode (i.e. anode) B, a separator C for separating the positive electrode and the negative electrode, and an electrolyte in electrochemical communication with the positive electrode and the negative electrode. The secondary battery G also may include a current collector D that is in electrical contact with the cathode and a current collector E that is electrical contact with the anode. The current collectors D and E may be in electrical contact with one another through an external circuit (not shown). The secondary battery G may exhibit a jelly roll or stacked construction. A lithium source material (i.e. lithia) F is incorporated into the positive electrode side. As shown in FIG. 1, F is located between the current collector D and separator C, and is distributed in the cathode A, coated on the surface of cathode A, coated on cathode side of the surface of separator C, or coated on the current collector D.

The cathode A may be formed of an active material, which is typically mixed with a conductive carbon agent and a binder polymer. The active material used in the cathode A is preferable a material that can be lithiated at a voltage of about 1.5 V to about 5.0 V versus lithium. Both lithiated or non-lithiated materials such as, but not limited to, $MnO_2$, $MoS_2$, $V_2O_5$, $LiVO_3$, S, $LiMn_2O_4$, $LiCoO_2$, $LiNiO_2$, $LiFePO_4$, or a mixture thereof, can be used as the active material. Lithia, F, may be distributed in the cathode A as lithium source for the battery. The anode, B, may be formed of an anode active material, which is typically mixed with a conductive carbon agent and a polymeric binder. In some cases, the anode may include lithium metal. The anode active material may be a material that is configured to be lithiated from about 0 V to 2.0 V versus lithium, with a high capacity material such as carbonaceous materials, Si, Si—C, SiO, Sn, tin oxides, composite tin alloys, transition metal oxides, lithium metal nitrides or lithium metal oxide. In some cases, the cathode A may contain a minor amount of catalyst in order to activate the lithia at lower voltage. Where the cathode contains a catalyst, the catalyst may be present from about 1 wt % to about 30 wt % of the cathode. In some embodiments, the catalyst is present from about 1 wt % to about 20 wt %. In further embodiments, the catalyst is present from about 1 wt % to about 5 wt %.

When lithia F is distributed in the cathode A for the battery, it could supply lithium source for the battery. Non-lithiated materials such as $MnO_2$, $V_2O_5$ or $MnS_2$ or a mixture of any two or more thereof, may be used as the active cathode material. Accordingly, the lithia F in the cathode side may be of a sufficient amount to supply lithium source. As such, the anode B need not include a lithiated material. Because non-lithiated materials generally have a higher specific capacity than lithiated active materials, they can provide increased power. Thus, if the lithium may be provided from an alkali source material in the cathode, high specific capacity and increased power batteries may be produces.

The cathode A may be a lithiated material such as $LiFePO_4$, $LiMnPO_4$, $LiCoO_2$, $LiMn_2O_4$, $LiNi_{1/3}Co_{1/3}Mn_{1/3}O_2$, $LiNiO_2$, $LiNi_{0.5}Mn_{1.5}O_4$, or $Li_2MnO_3*LiMO_2$. Lithia F, in FIG. 1, is distributed in the cathode A. Where the alkali source material is lithia, both the lithiated material (i.e. cathode active material) and the lithia could supply lithium ions for the battery. Accordingly, in some embodiments, a lithiated, cathode active material (such as $LiFePO_4$, $LiMnPO_4$, $LiCoO_2$, $LiMn_2O_4$, $LiNiO_2$, $LiNi_{0.5}Mn_{1.5}O_4$, $Li_2MnO_3*LiMO_2$ or a mixture of any two or more thereof) may be included in the cathode A, a non-removable lithium material may be used as an anode (such as carbonaceous materials, Si, SiO—, Si—C, Sn, a tin oxides, composite tin alloys, transition metal oxides, lithium metal nitrides, or a mixture of any two or more thereof) as anode B. Lithia F is in the cathode side. Separator C and electrolyte may be used to form a secondary battery.

For the anode B a carbonaceous materials, Si, Si—C, SiO, Sn, tin oxide, a composite tin alloy, a transition metal oxide, or a lithium metal nitride may be used. Graphite or graphitization carbons are currently commercial used as an anode material ion lithium ion batteries. The maximum theoretical capacity of a graphite anode is 372 mAh/g. Graphite or carbon anodes typically consume between 7 and 20% of the inserted initial lithium ions to build a passivation layer (SEI) to protect the graphite from continuous chemical reaction with the electrolyte. As this lithium is provided from the cathode material some amount of cathode material will not be active. The presence of a small amount of alkali source material such as $Li_2O$ ($Li_2O$ with theoretical capacity of 1786 mAh/g vs. $LiCoO_2$ with theoretical capacity of 270 mAh/g) in the cathode will increase the battery energy density as this lithium is going to compensate the lithium loss due the formation of passivation layer (SEI) on the anode.

The low specific capacity of graphite anodes is a limiting factor in the development of Li-ion batteries with high energy density. To increase the specific energy of lithium ion batteries, alternative anode materials with higher capacity are needed. Si is one of potential anode material, its superior theoretical specific capacity of 3579 mAh/g, the highest capacity of any known anode materials at room temperature other than Li metal. However, one of problems is that Si-based anodes suffer from huge irreversible capacity loss during initial discharge and charge process, which consumes a lot of lithium from the cathode side and lower capacity of the batteries. So Si anodes were not considered to satisfy the needs of practical applications. However, using Si as an anode, the capacity is about 3000 mAh/g, but the anode first cycle efficiency is low, in some case, lower than 50%. Accordingly, an Si anode will irreversibly consume a large amount of lithium source from cathode A. However, where the present cathodes with the alkali source materials are used with a Si anode, the Lithia may compensate for the irreversible capacity of the anode and maintain cathode material itself efficiency.

In lithium-air (oxygen) batteries, the positive electrode is a porous activated positive electrode such as a porous carbon material. The anode is typically lithium metal. Where the cathode of a lithium-air battery is as above, with an alkali source material such as lithia in the porous carbon, it is not necessary to have the lithium metal as anode.

The batteries and electrochemical cells described herein may be used for various types of applications. For example, the secondary batteries may be used in portable electronics such as cell phones, laptop computers, and cameras, and in large power applications such in electric vehicles, hybrid electric vehicles, plug-in hybrid electric vehicles and smart grids.

The secondary batteries and cathodes described herein have high specific capacity, safe operating conditions, and good cycleability. In particular, because an alkali source material, i.e. lithia, is present in the positive electrode and supplies the lithium source for the battery, non-lithiated materials may be used as the preferred cathode active material in the secondary battery. Such non-lithiated materials may have higher specific capacities than the lithiated material presently used in lithium ion battery. Unlike traditional lithium secondary batteries having non-lithiated cathode active materials and metallic lithium anodes, it has been discovered that secondary batteries produced non-lithiate cathode active material with lithium source material lithia of the invention combine with the anodes operate safely and do not generate lithium dendrite upon cycling. The alkali source materials, such as lithia, in the cathode may compensate for irreversible capacity loss of the anode such as Si and improve the cathode material coefficient of utilization.

The present invention, thus generally described, will be understood more readily by reference to the following examples, which are provided by way of illustration and are not intended to be limiting of the present invention.

EXAMPLES

Example 1

A slurry in N-methylpyrrolidone (NMP) solvent was prepared with 84% lithia ($Li_2O$), 8% polyvinylidene difluoride (PVDF) polymer binder and 8% carbon black. The slurry was coated onto an aluminum current collector foil using a doctor-blade, and the solvent was evaporated in the oven at 70° C. to form an electrode.

The electrode was then evaluated in a CR2032 coin cell with a 1.2 M $LiPF_6$ solution in ethylene carbonate: ethylmethyl carbonate (3:7 by weight, Tomiyama) as electrolyte.

Figure 2:
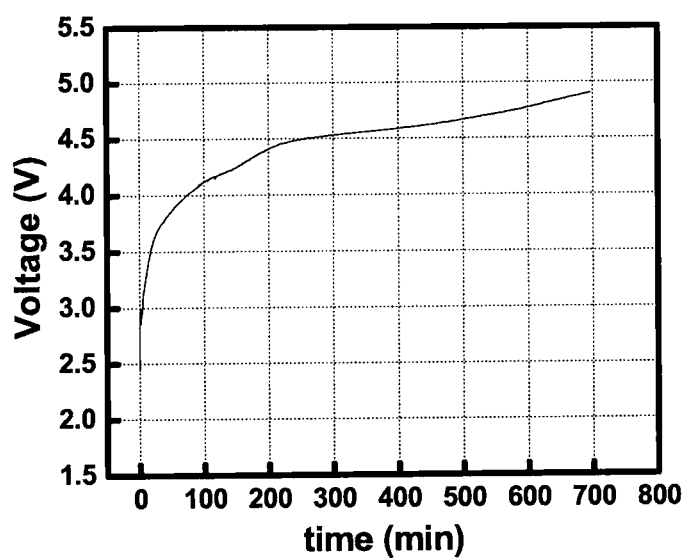
FIG. 2 illustrates a typical initial charge curve of a $Li_2O$/Li cell.

The voltage profile of the coin cell using the above-prepared electrode as the positive electrode, and using Li metal as negative electrode is shown in FIG. 2. During the initial charge at 4.9 V, the positive electrode was activated. The cell shows a long charge plateau above 4.5 V. This plateau is from the $Li_2O$ component. In this process, oxygen is removed, or at least partially removed, from the structure and at same time the lithium migrates to the anode.

Example 2

Figure 3A:
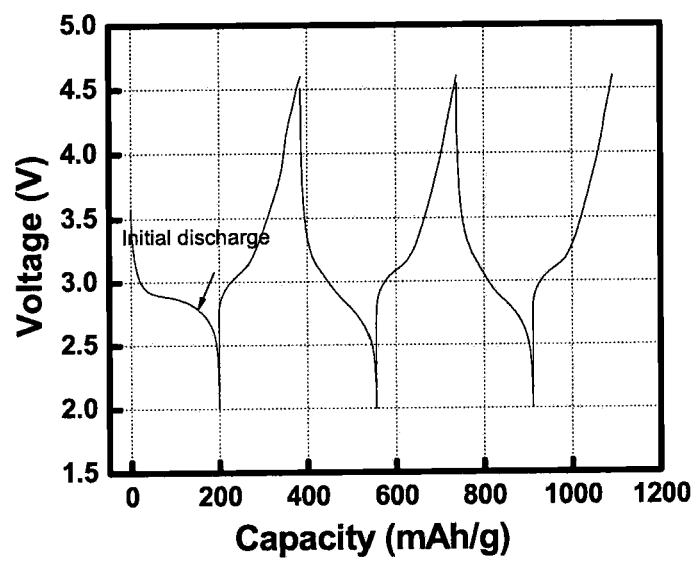
FIGS. 3A and 3B are (A) charge and discharge curves and (B) cycle life, respectively, of a $MnO_2$/Li half cell, according to the examples.
Figure 3B:
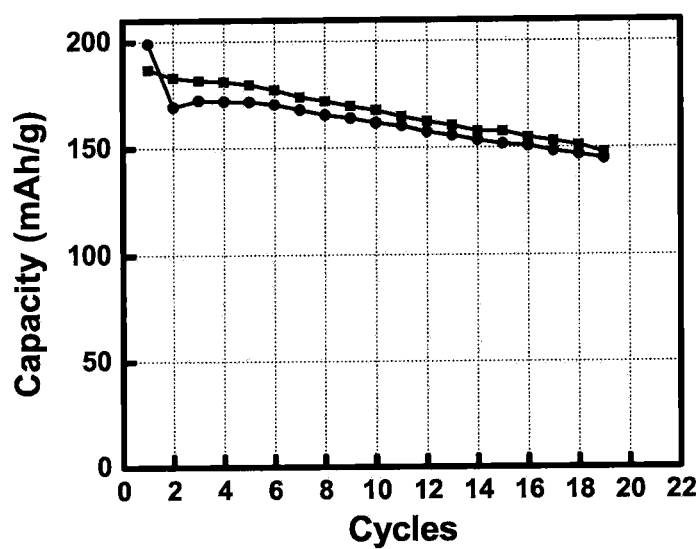

An electrode was made as above in NMP with 84% chemical manganese dioxide (CMD; a non-lithiated cathode material), 8% PVDF and 8% carbon black. The CMD electrode was evaluated in a half-cell using Li metal as anode, and 1.2 M $LiPF_6$ in EC:EMC (3:7 in weight) as an electrolyte. The discharge and charge curves for the coin cell are shown in FIG. 3A. In this half-cell, it provides an initial open voltage-circuit voltage of 3.6 V. It yielded an initial discharge capacity of about 200 mAh/g when discharged to a cut-off voltage of 2.0 V with 10 mA/g. The cell was then charged to 4.6 V and cycled between 2.0 and 4.6 V. The charge and discharge curves are plotted in FIG. 3B. After 20 cycles, the cell capacity drops to about 150 mAh/g. This illustrates a typical electrochemical performance of manganese dioxide as cathode material in lithium ion batteries.

Example 3

Figure 4A:
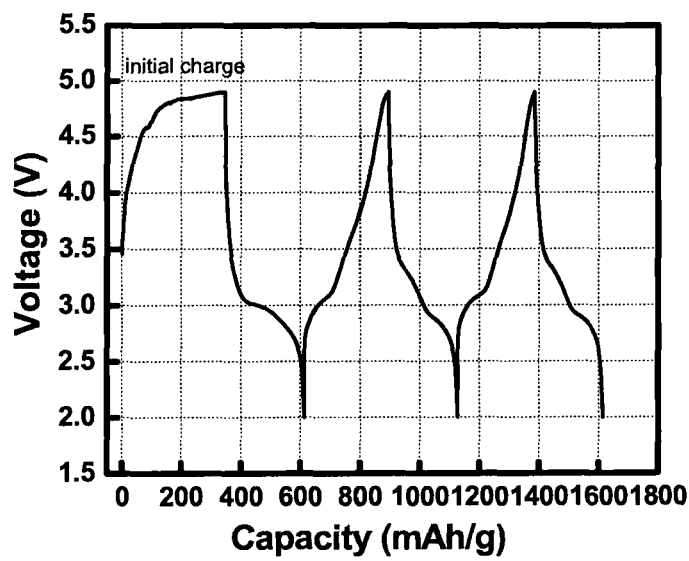
FIGS. 4A and 4B are (A) charge and discharge curves and (B) cycling life, respectively, of a $Li_2O$ blend with a $MnO_2$/Li half cell, according to the examples.
Figure 4B:
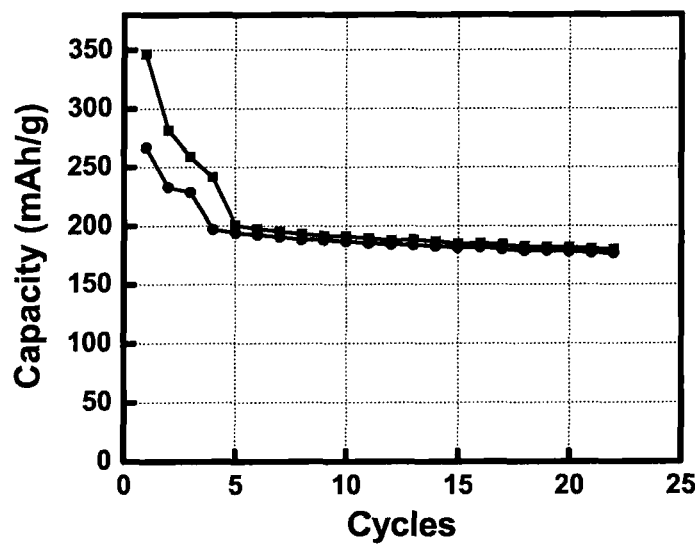

CMD was used as cathode, and $Li_2O$ was used as a lithium resource material, with both chemicals being blended in the positive electrode. The electrode was prepared similarly to that of Example 1 in NMP with 62% CMD, 22% $Li_2O$, 8% PVDF and 8% carbon black. The electrode was prepared in an inert atmosphere glove-box. The half-cell was built using the electrode as a cathode and lithium metal as an anode. FIG. 4A illustrates the charge and discharge behavior of the cell. Initially, the cell was charged to 4.9 V, with a flat plateau above 4.5 V. This is similar to the results for the pure $Li_2O$ electrode in example 1. Following discharge to 2.0 V, the curve shows a plateau at 3.0 V. Cycling was then continued between 2.0 to 4.9 V. During the second charge, the flat plateau is diminished compared to the plateau of the first charge, indicating that the $Li_2O$ that was activated is an irreversible process. After that, only the CMD acts as a rechargeable cathode in the lithium ion batteries. After 20 cycles, the cell capacity faded to about 180 mAh/g.

Example 4

Figure 5A:
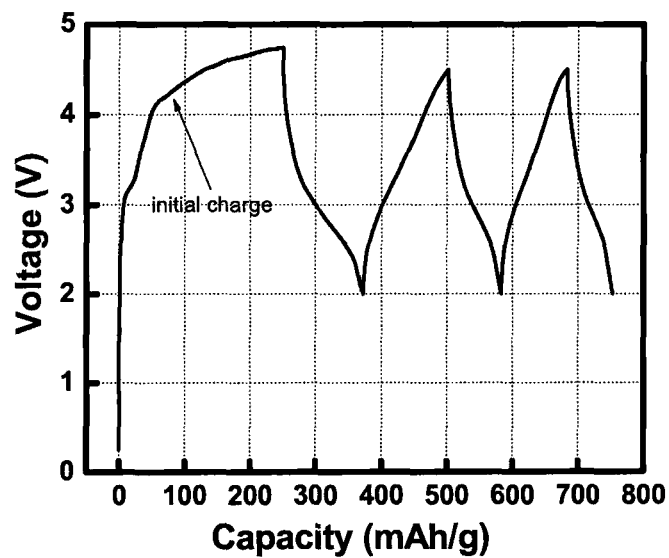
FIGS. 5A and 5B are (A) charge and discharge curves and (B) cycling life, respectively, of a $Li_2O$ blend with $MnO_2$/graphite full cell, according to the examples.
Figure 5B:
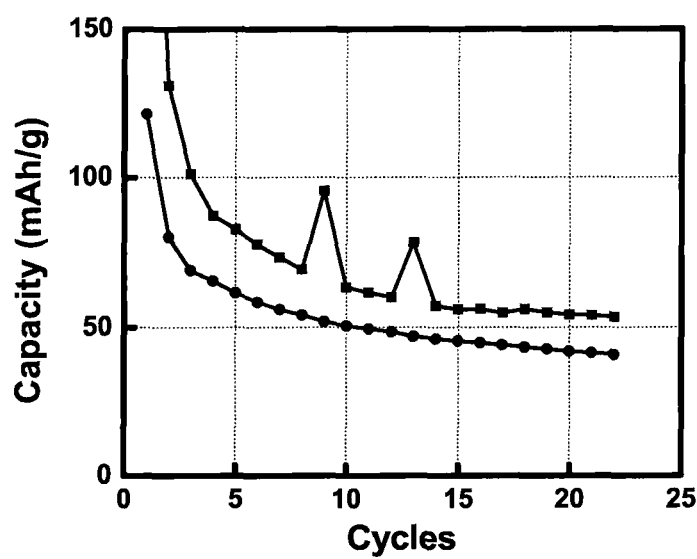

A cathode was prepared as in Example 1 in NMP with 62% CMD, 22% $Li_2O$, 8% PVDF and 8% carbon black. A full cell was prepared with the cathode and an anode of 90% graphite (ConocoPhillips A12), and 10% PVDF. The full cell also employed a separator of Celgard 2325 as separator, 1.2 M $LiPF_6$ in EC:EMC solution (3:7 in weight) as electrolyte. The full cell was tested as a CR2032 coin cell. The initial charge and discharge curves for the cell are shown in FIG. 5A. The cell showed an open voltage close to 0 V. The cell was charged using a 5 mA/g current to charge to 4.8 V. During charging the cell exhibited a flat plateau during the first charge, which is attributed to the $Li_2O$ supplying Li ion to the anode side. Subsequently, the cell was discharged to 2.0 V. The first discharge capacity was about 120 mAh/g. In this discharge process, the CMD was lithiated. Lithium ion only comes from the lithium in graphite anode. It is shown that the $Li_2O$ supplies the Li ion to the anode and back to the cathode. It also indicates that there is no need for Li metal as an anode, because the lithium supplied from the $Li_2O$ is sufficient for battery operation.

Example 5

Figure 6A:
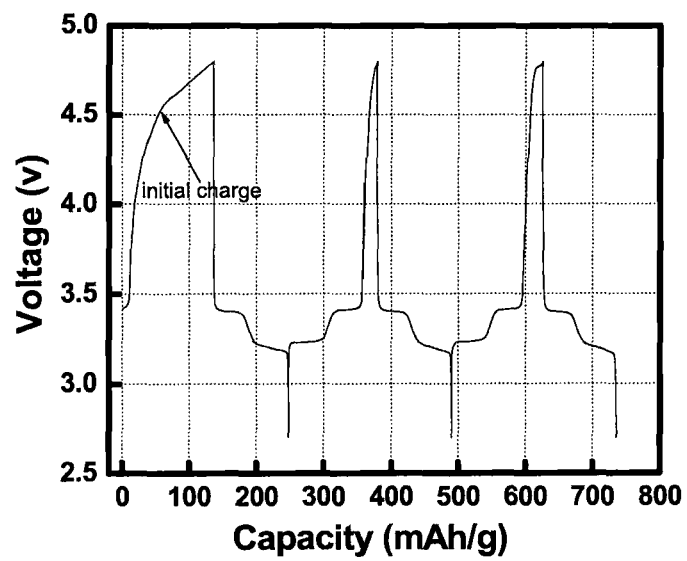
FIGS. 6A and 6B are (A) initial charge and discharge curves and (B) cycle life, respectively, of a $Li_2O$ blend with $V_2O_5$/Li half cell, according to the examples.
Figure 6B:
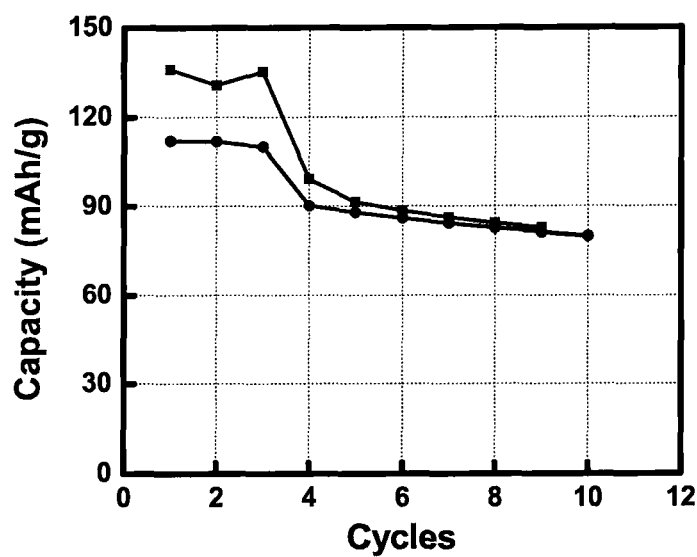

In this example, vanadium oxide ($V_2O_5$) was used as cathode material, and $Li_2O$ was used as a lithium resource in the cathode. The electrode was prepared from an NMP slurry as in Example 1 with 56% $V_2O_5$, 28% $Li_2O$ and 8% PVDF and 8% carbon black. The electrode was prepared in the glove-box. A half-cell was built using this electrode as the cathode and lithium metal as anode. Charge and discharge behavior of the half-cell is shown in FIG. 6. As shown, initially the cell was charged to 4.8 V, where it exhibits a plateau at high voltage with about 125 mAh/g, which is related $Li_2O$ decomposition. The cell was then discharged to 2.6 V, with the discharge curve showing typical $V_2O_5$ characters, with two plateaus about 3.2 to 3.4 V. The discharge capacity was about 110 mAh/g. The cell was then again charged to 4.8 V. From 3.2 V to 3.4 V another two charge plateaus occur, indicating that the two redox couples from $V_2O_5$ are readily reversible. Up to high voltage at 4.8 V, no plateaus occurred as during the initial charge, which indicated that all the $Li_2O$ was activated.

Example 6

Figure 7:
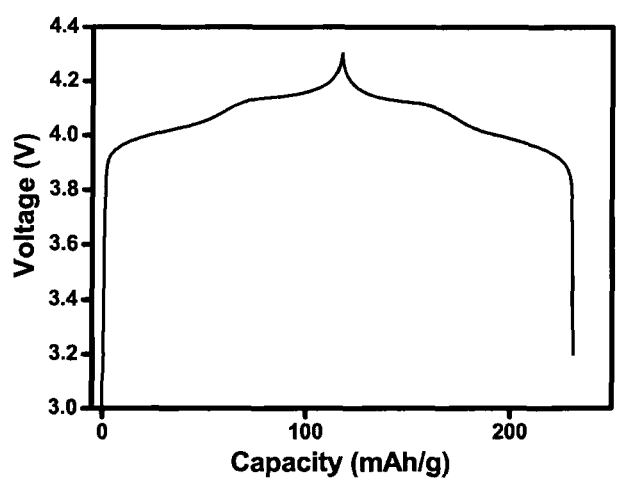
FIG. 7 is an initial charge and discharge curve of a spinel $LiMn_2O_4$/Li half cell, according to the examples.

A cathode was prepared according to Example 1 using 84% $LiMn_2O_4$, 8% PVDF and 8% carbon black. A half-cell of $LiMn_2O_4$/Li was tested and the charge and discharge capacity is illustrated in FIG. 7. The charge capacity and discharge capacity of the $LiMn_2O_4$ was 117 mAh/g and 113 mAh/g, respectively, providing for an efficiency of about 96.5%. Based upon the charge and discharge curve, the operating work potential is about 4.0 V, with two flat plateaus on the charge and discharge curves.

Example 7

Figure 9:
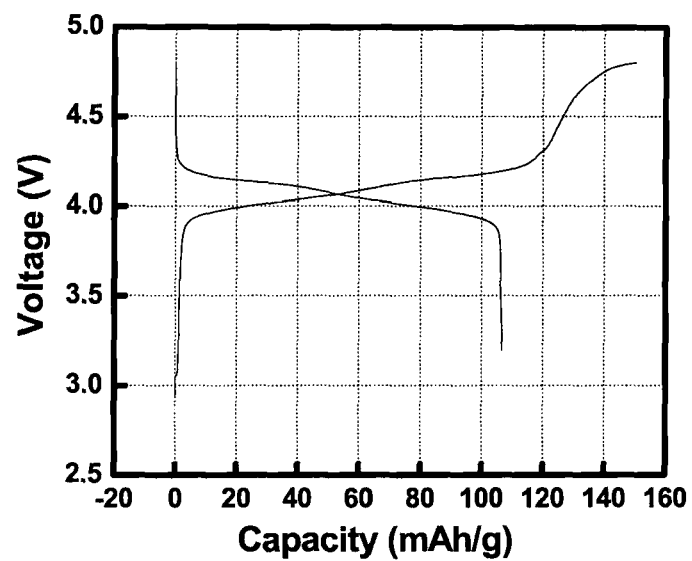
FIG. 9 is an initial charge and discharge curve of a spinel $LiMn_2O_4$ blended with a $Li_2O$/Li half cell, according to the examples.

A cathode was prepared according to Example 1 using spinel $LiMn_2O_4$ was used as the cathode, and $Li_2O$ was used as a lithium resource. The cathode included 78% $LiMn_2O_4$, 6% $Li_2O$, 8% PVDF, and 8% carbon black. The electrode was prepared in the inert atmosphere glove-box. A half-cell of the cathode was prepared, along with lithium metal as anode. FIG. 9 illustrates a cut-off voltage of 4.8 V for the cell, and a cell open voltage of about 3.0 V. After application of a current, the voltage of the cell increased, and two plateaus are exhibited at a voltage of 4.0 V, which is typical for $LiMn_2O_4$ as cathode. The capacity of the cell was about 120 mAh/g. The mechanism is believed to be extraction of the lithium ion from the $LiMn_2O_4$ structure, where it is then transferred to the anode side through the electrolyte.

Above 4.3 V, the reaction related with $LiMn_2O_4$ is complete, as illustrated by the increasing voltage after the plateau. At a voltage above 4.4 V, another plateau forms on the charge curve, and is due to lithium extraction from the $Li_2O$ compound. Thus, above 4.4 V, the $Li_2O$ is activated and acts as a lithium source for the battery. This lithium is also transmitted from the cathode side to the anode side through the electrolyte. The cell was then discharged to 3.0 V. Upon discharge, the lithium is transmitted from the anode to the cathode. The $LiMn_2O_4$ cathode is reversible. Upon discharge, two plateaus are formed at 4 V, with a capacity of about 110 mAh/g. The $Li_2O$ activation and release of lithium is an irreversible process that occurs during the initial charge process.

Example 8

Figure 8:
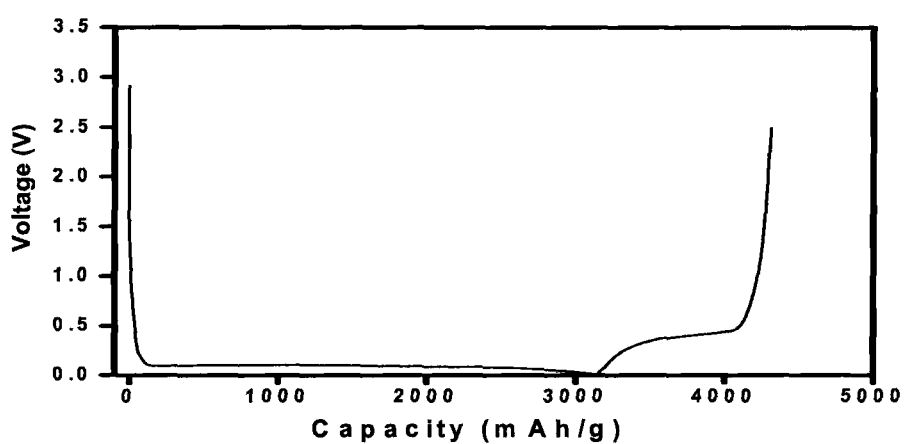
FIG. 8 is an initial charge and discharge curve of a Si/Li half cell, according to the examples.

An electrode was prepared as in Example 1 with a slurry prepared in NMP of 84% Si, 8% PVDF binder, and 8% carbon black. The slurry was coated onto a copper current collector foil using doctor-blade, followed by drying in the oven at 70° C. A CR2032 coin cell was prepared with the electrode, lithium metal as an anode, and an electrolyte 1.2 M $LiPF_6$ solution in EC:EMC (3:7 by weight, Tomiyama). The open voltage of the freshly assembled half-cell was about 3.0 V, The cell was discharge to 0.04 V and charged to 3.0 V. During discharge, the lithium ion would transmit from lithium metal to Si electrode through the electrolyte. As illustrated in FIG. 8 this yielded an initial discharge capacity of 3100 mAh/g. The cell can then discharge by transmission of the lithium ions from the Si electrode to the negative, Li electrode, through the electrolyte. Upon discharge, the charge capacity was only about 1200 mAh/g, which indicates that only about 40% of the discharge capacity is reversible. In other words, only about 40% of the Li inserted into the Si can be used for lithium ion batteries.

Figure 10:
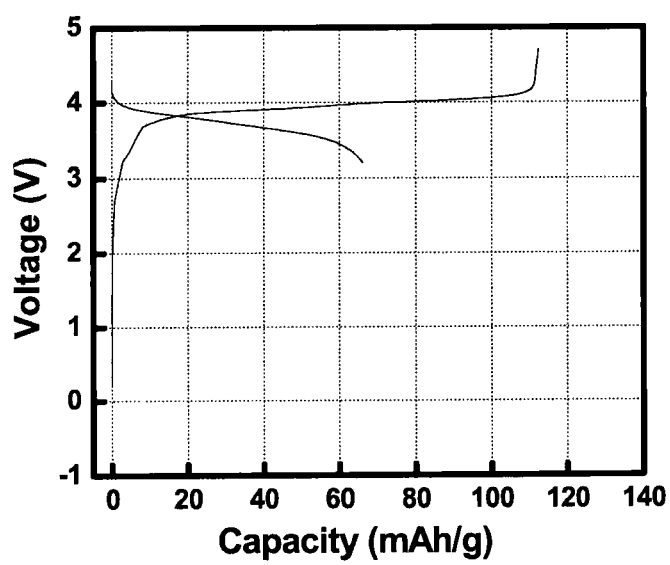
FIGS. 10A and 10B are (A) initial charge and discharge curves and (B) cycle life, respectively, of a spinel $LiMn_2O_4$/Si full cell, according to the examples.
Figure 10:
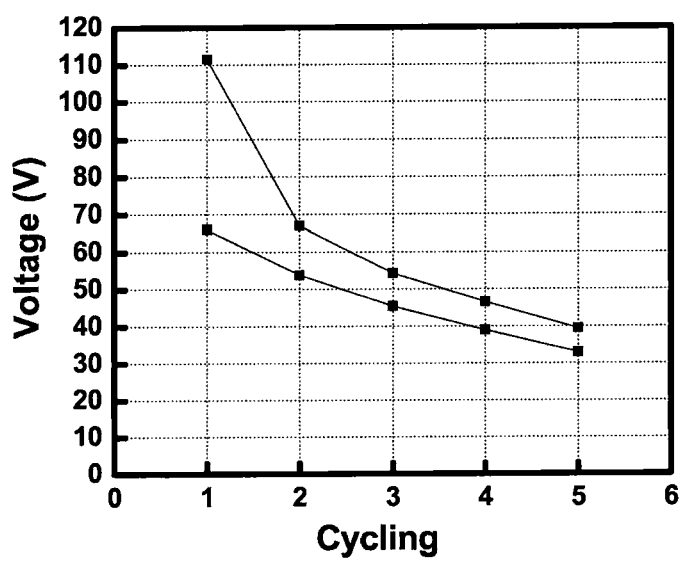

A full cell (CR2032 coin cell) was then prepared with the Si electrode as an anode, and a cathode of $LiMn_2O_4$ as cathode. The cathode included 84% $LiMn_2O_4$, 8% PVDF, and 8% carbon black. The Si anode included 84% Si, 8% PVDF, and 8% carbon black. The electrolyte for the full cell was a commercial 1.2 M $LiPF_6$ solution in EC:EMC (3:7 by weight, Tomiyama). For a as-prepared full cell assembly, the open voltage was close to 0 V. Upon application of a current, the voltage of the cell increased, as lithium ions were transmitted from the cathode to the anode. FIG. 10 illustrates the charge curve having a charge plateau at about 4 V, and a charge capacity of about 110 mAh/g. The charge capacity was determined by the amount of $LiMn_2O_4$ cathode material. After discharging the cell to 3.0 V, a plateau was exhibited at 4 V. However, the discharge capacity was only about 63 mAh/g, which indicates that the cell was only about 57% reversible with respect to capacity and the fact that some lithium was consumed by the silicon anode.

Example 9

Figure 11A:
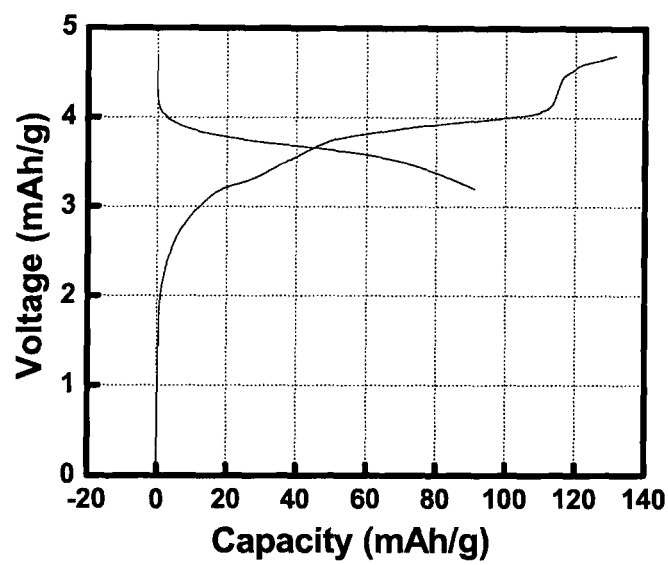
FIGS. 11A and 11B are (A) initial charge and discharge curves and (B) cycle life, respectively, of a spinel $LiMn_2O_4$ blended with a $Li_2O$/Si full cell, according to the examples.
Figure 11B:
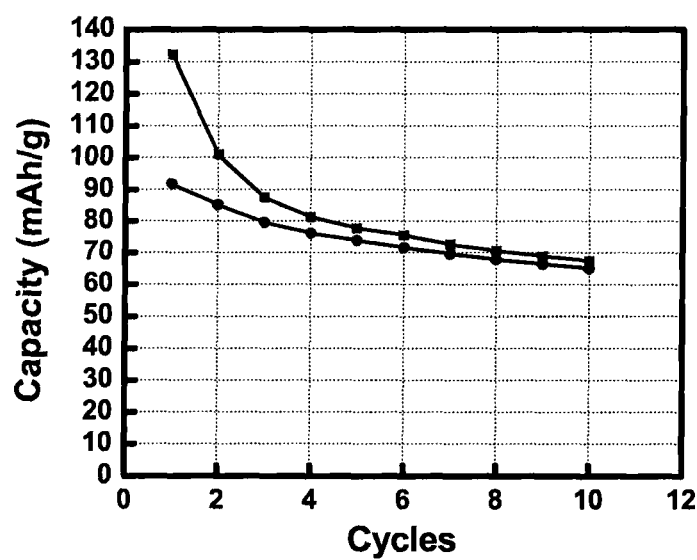

In this example, a full cell (CR2032 coin cell) was prepared. The cathode for the full cell was based upon 78% $LiMn_2O_4$, 6% $Li_2O$, 8% PVDF, and 8% carbon black. The anode for the full cell was based upon the Si anode having 84% Si, 8% PVDF, and 8% carbon black. The electrolyte for the full cell was a commercial 1.2 M $LiPF_6$ solution in EC:EMC (3:7 by weight, Tomiyama). For a as-prepared assembly, the open voltage is close to 0 V, but upon application of a current, the voltage of the cell increased. During the current application, the lithium ion is transmitted from the cathode $LiMn_2O_4$ and lithium source material, $Li_2O$, to the negative electrode Si through the electrolyte. As shown by the graphs in FIG. 11, this occurs through two steps. The charge curve has a charge plateau at about 4 V, which related with the cathode $LiMn_2O_4$, and the charge capacity is about 110 mAh/g. At a voltage of 4.1 V, the charge plateau ends as the lithium from the cathode is transmitted to the anode. Upon additional charging, the voltage increases, and another plateau is exhibited above 4.4 V, and is related the $Li_2O$ activation process. The cell was then discharged to 3.0 V, where it exhibits a flat plateau at 4 V related with cathode $LiMn_2O_4$. The discharge capacity can reach about 90 mAh/g based on the cathode material, indicating the charge/discharge is about 81% reversible. The reversible capacity of the Si anode is compensated for by the Li ions from the $Li_2O$, so the efficiency of the cathode was improve significantly. After 10 cycles, the cell capacity was about 70 mAh/g.

Example 10

In this example, $Na_{0.75}Mn_{0.7}Ni_{0.23}O_2$ oxide was used as a cathode material. $Na_{0.75}Mn_{0.7}Ni_{0.23}O_2$ oxide was prepared by heating a mixture of $Na_2CO_3$ and $Mn_{0.75}Ni_{0.25}CO_3$ precursors at 900° C., in air for 16 hours. The cathode was prepared as a slurry in NMP with 79% $Na_{0.75}Mn_{0.7}Ni_{0.23}O_2$ oxide, 3% $Li_2O$ and 9% PVDF and 9% carbon black on an aluminum current collector. A comparative cathode was also prepared without the $Li_2O$, the cathode electrode including 80% $Na_{0.75}Mn_{0.7}Ni_{0.23}O_2$ oxide, 10% PVDF, and 10% carbon black. Hard carbon was used as a sodium active anode. An anode laminate was prepared by mixing 80% hard carbon, 10% PVDF, and 10% carbon black. The electrolyte was 1M $NaPF_6$ in EC:EMC (3:7).

Figure 12A:
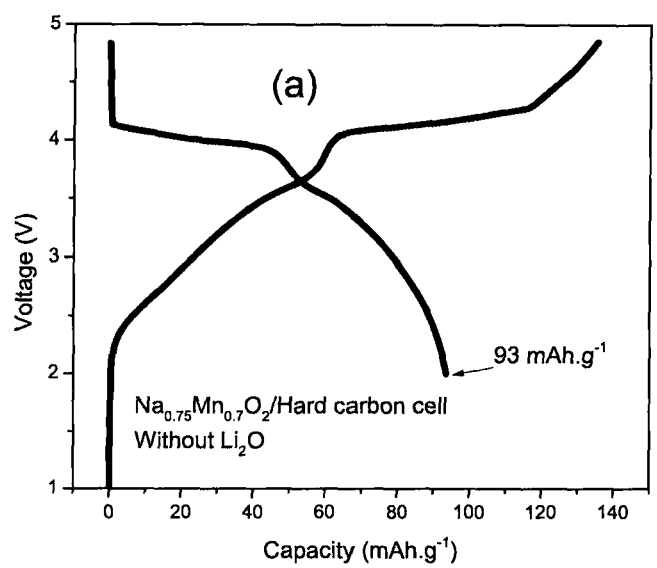
FIGS. 12A and B are the initial charge and discharge curves of a full sodium battery using $Na_{0.75}Mn_{0.70}Ni_{0.23}O_2$ with lithia (12B) and without lithia (12A) as cathode, and using hard carbon as an anode, according to the examples.
Figure 12B:
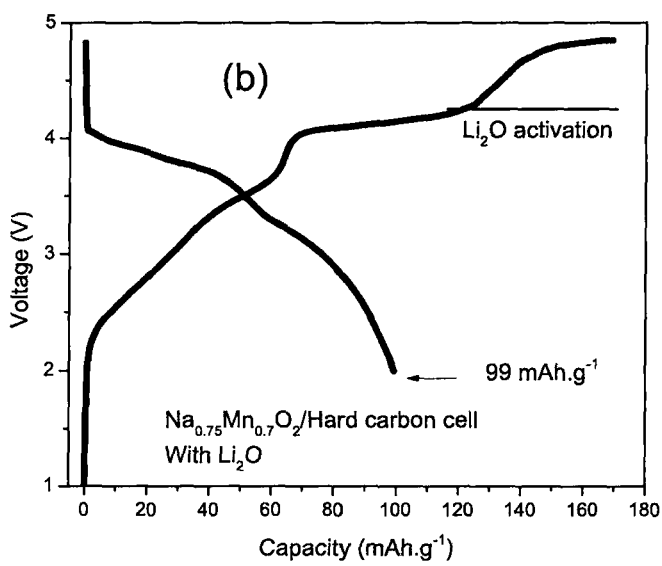

Sodium full cells containing active materials (with and without $Li_2O$) were charged to 4.85 V and discharged to 2 V. Without the presence of $Li_2O$, the $Na_{0.75}Mn_{0.7}Ni_{0.23}O_2$ material delivers a discharge capacity of 93 mAh/g (FIG. 12 B). Based on the $Na_{0.75}Mn_{0.7}Ni_{0.23}O_2$ oxide cathode amount, the presence of small amount of $Li_2O$ improves the discharge capacity to about 99 mAh/g, as shown in FIG. 12A. With the electrode that includes the $Li_2O$, a plateau is observed at about 4.75 V.

Example 11

Figure 13:
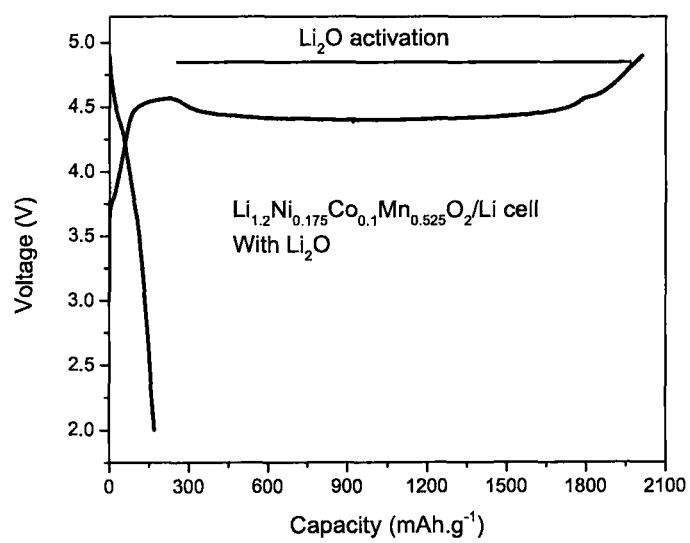
FIG. 13 is the initial charge and discharge curve of a half cell lithium battery using lithium manganese rich composite material ($LiMO_2$ $Li_2MnO_3$, M=Ni, Mn, Co) $Li_{1.2}Ni_{0.175}Co_{0.1}Mn_{0.525}O_2$ blended with $Li_2O$, super P carbon and PVDF binder in ratio 32/48/10/10 on a weight basis, respectively, according to the example.

In order to demonstrate that the activation of $Li_2O$ is easily achieved when lithia is mixed with a lithium manganese rich composite material (e.g. $LiMO_2$ $Li_2MnO_3$, M=Ni, Mn, Co), a laminate was prepared using $Li_2O$, carbon, and $Li_{1.2}Ni_{0.175}Co_{0.1}Mn_{0.525}O_2$. The laminate was prepared using 32 wt % $Li_{1.2}Ni_{0.175}Co_{0.1}Mn_{0.525}O_2$, 48 wt % $Li_2O$, 10 wt % PVDF, and 10 wt % carbon black. Lithium metal was used as an anode and the electrolyte was a commercial 1.2 M $LiPF_6$ solution in EC:EMC (3:7 by weight, Tomiyama). The coin cell was cycled using 10 mA/g of $Li_{1.2}Ni_{0.175}Co_{0.1}Mn_{0.525}O_2$ material current rate. During charging, the lithium ion is transmitted from the cathode $Li_{1.2}Ni_{0.175}Co_{0.1}Mn_{0.525}O_2$, where nearly 300 mAh/g is obtained. Lithium ion is also transmitted from the lithium source material, $Li_2O$, to the anode through the electrolyte where an extra capacity of about 1140 mAh/g of $Li_2O$ was obtained, as illustrated by the graphs in FIG. 13.

Example 12

Figure 14:
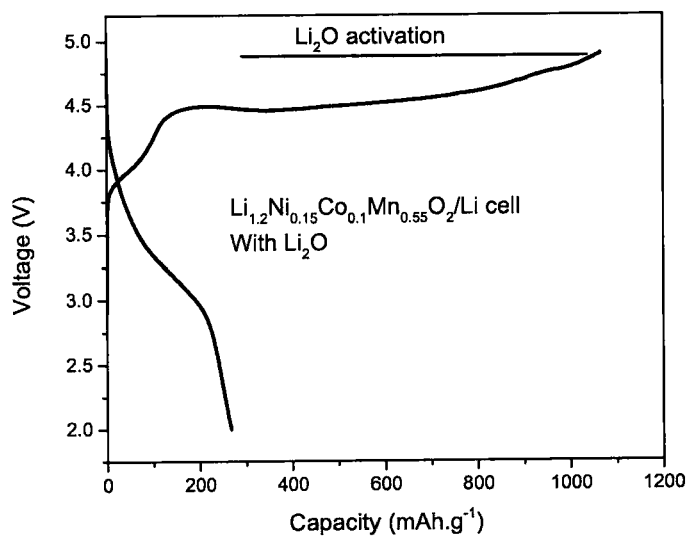
FIG. 14 is the initial charge and discharge curve of a half cell lithium battery using $Li_{1.2}Ni_{0.15}Co_{0.1}Mn_{0.55}O_2$ blended with $Li_2O$, super P carbon and PVDF binder in ratio 30/30/30/10 on a weight basis, respectively, according to the example.

A laminate was prepared as in Example 11 with 32/48/10/10 on a weight basis of $Li_{1.2}Ni_{0.15}Co_{0.1}Mn_{0.55}O_2$, $Li_2O$, PVDF, and carbon black, respectively. The current rate was increased from 10 mA/g to 20mA/g of $Li_{1.2}Ni_{0.15}Co_{0.1}Mn_{0.55}O_2$. During charging, the lithium ion is transmitted from the cathode $Li_{1.2}Ni_{0.15}Co_{0.1}Mn_{0.55}O_2$ where nearly 300 mAh/g of $Li_{1.2}Ni_{0.15}Co_{0.1}Mn_{0.55}O_2$ is obtained. Lithium ion is also transmitted from lithium source material, $Li_2O$, to the negative electrode Li through the electrolyte where an extra capacity of about 800 mAh/g of $Li_2O$ was obtained, as illustrated by the graphs in FIG. 14.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A secondary battery comprising:
   a cathode comprising:
   from about 1 wt % to about 40 wt % of $Li_2O$; and
   a lithium transition metal rich oxide composite of $LiMO_2$—$Li_2M'O_3$, wherein M and M' are selected from the group consisting of Ni, Mn, V, Ti, Cu, Co, Cr, and Fe;
   an anode comprising an anode active material;
   an electrolyte;
   a separator.

2. The secondary battery of claim 1 which is a lithium ion battery, a lithium-sulfur battery, or a lithium-air battery.

3. The secondary battery of claim 1, wherein the anode active material is a carbon material, Li metal, Si, Si—C, SiO, Sn, Sb, tin oxide, a tin carbon, a composite tin alloy, $Li_4Ti_5O_{12}$, a transition metal oxide, a lithium metal nitride or a mixture of any two or more thereof.

4. The secondary battery of claim 1, wherein the cathode further comprises a non-lithiated material.

5. The secondary battery of claim 4, wherein the non-lithiated material is selected from the group consisting of carbon materials, $MnO_2$, S, $V_2O_5$, $MnF_3$, and $FeF_3$.

6. The secondary battery of claim 1, wherein the anode active material comprises lithium metal, Si, Sn, SiO, Si—C, $Li_4Ti_5O_{12}$, a tin oxide, a tin carbon, a carbon material, a composite tin alloy, a transition metal oxide, a lithium metal nitride, or a mixture of any two or more thereof.

7. A secondary battery comprising:
   an anode comprising an anode active material;
   an electrolyte;
   a separator; and
   an as-prepared cathode comprising:
   $LiO_2$; and
   $LiMO_2$—$Li_2M'O_3$;
   wherein:
   M and M' are selected from the group consisting of Ni, Mn, V, Ti, Cu, Co, Cr, and Fe.

8. The secondary battery of claim 7, wherein the as-prepared cathode further comprises a non-lithiated material.

9. The secondary battery of claim 8, wherein the non-lithiated material is selected from the group consisting of carbon materials, $MnO_2$, S, $V_2O_5$, $MnF_3$, and $FeF_3$.

10. The secondary battery of claim 1, wherein the alkaline source material is present from about 10 wt % to about 40 wt %.

11. The secondary battery of claim 1, wherein the alkaline source material is present from about 5 wt % to about 10 wt %.

* * * * *